(No Model.)
2 Sheets—Sheet 1.
H. CROFT, Jr.
WIND ENGINE.
No. 266,612.
Patented Oct. 31, 1882.
Fig. 1.
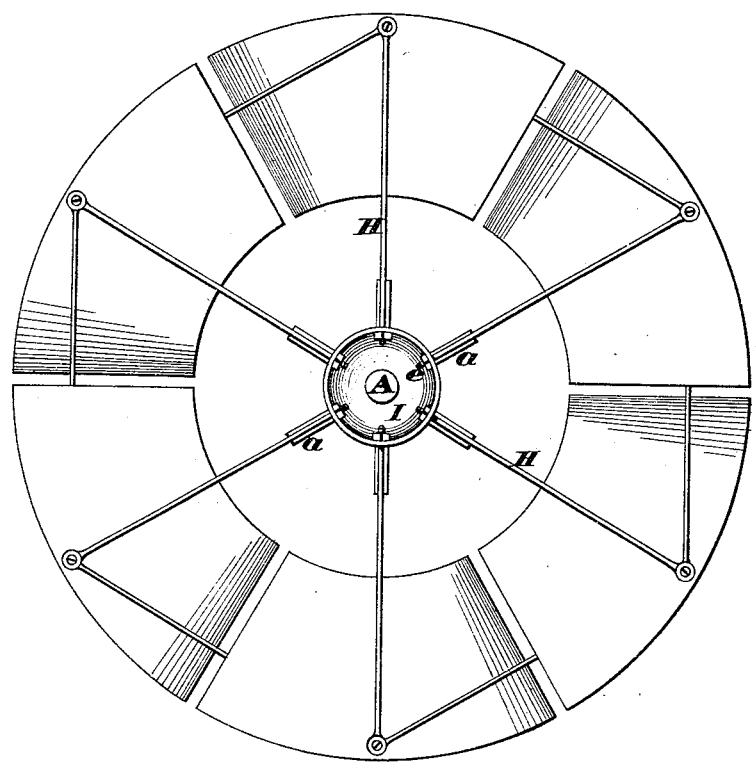
Fig. 2.
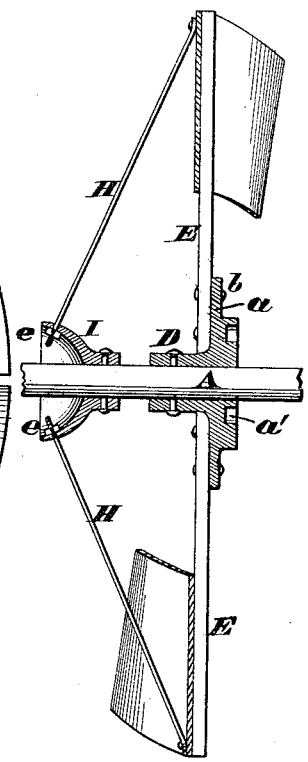
Fig. 3.
Fig. 4.
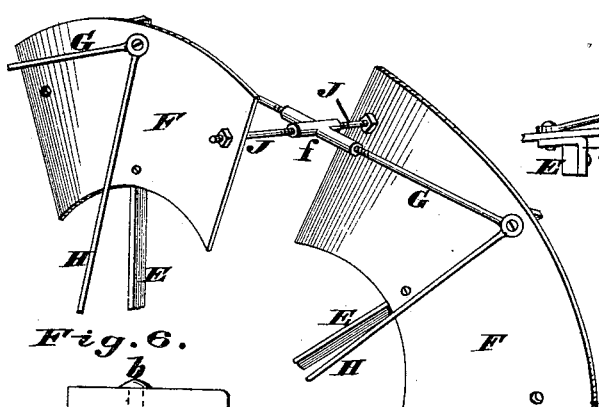
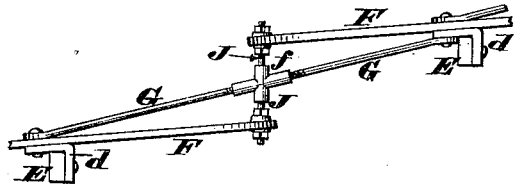
Fig. 5.
Fig. 6.
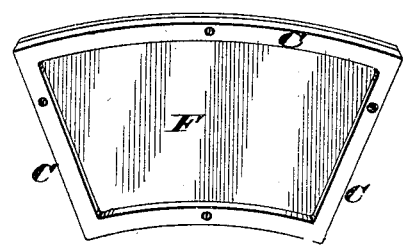
Attest.
Inventor.
Henry Croft Jr

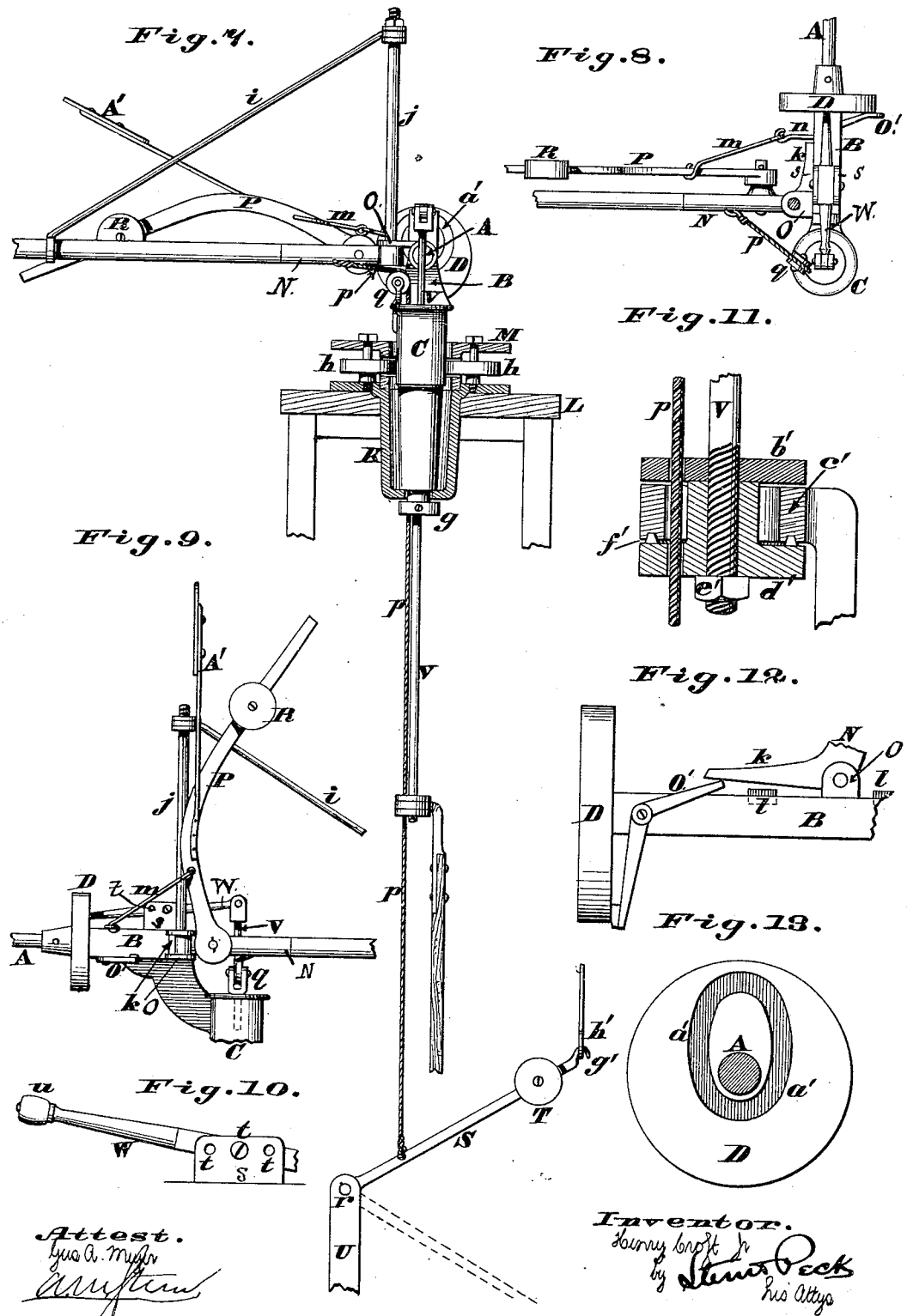

United States Patent Office.

HENRY CROFT, JR., OF SPRINGFIELD, OHIO.

WIND-ENGINE.

SPECIFICATION forming part of Letters Patent No. 266,612, dated October 31, 1882.

Application filed May 31, 1882. (No model.)

*To all whom it may concern:*

Be it known that I, HENRY CROFT, Jr., a citizen of the United States, residing at Springfield, in the county of Clarke and State of Ohio, have invented certain new and useful Improvements in Wind-Engines, of which the following is a full, clear, and exact description.

The novelty of my invention consists in the construction and combination of the various parts composing the engine, as will be herewith set forth and specifically claimed.

In the accompanying drawings, Figure 1, Sheet 1, is a face or plan view of the windwheel. Fig. 2, Sheet 1, is a central sectional view of the same in side elevation. Fig. 3, Sheet 1, is a perspective view of a portion of the wind-wheel. Fig. 4, Sheet 1, is a plan view of the sail-bracing devices of the windwheel. Fig. 5, Sheet 1, is a perspective view of the rear of one of the sails. Fig. 6, Sheet 1, is an enlarged sectional view through one of the sail-arm sockets. Fig. 7, Sheet 2, is a rear elevation of the turn-table and adjacent parts, showing so much of the machine as is necessary to illustrate my invention. Fig. 8, Sheet 2, is a plan view of Fig. 7. Fig. 9, Sheet 2, is a side elevation of the turn-table and upper parts of the machine. Fig. 10, Sheet 2, is an enlarged detail view of the walking-beam which actuates the pump-rod. Fig. 11, Sheet 2, is an enlarged sectional view of the pump-rod swivel. Fig. 12, Sheet 2, is a bottom plan view of the brake mechanism. Fig. 13, Sheet 2, is a face view of the walking-beam-actuating cam.

The same reference-letters indicate like parts in all the figures.

Referring now to Sheet 1, I would thus describe my improved wind-wheel:

A is the wheel spindle or shaft, suitably journaled in a bracket-sleeve, B, extending from and forming part of the turn-table C. The sleeve and turn-table are shown in Figs. 7, 8, and 9 of Sheet 2.

From a hub, D, keyed or otherwise fastened upon the shaft A just in front of the sleeve B, extend as many radial arms E as there are sails or buckets to the wheel. These arms are set edgewise, or with their edges in line with the spindle A, in sockets $a$, projecting radially from the hub D, as seen in Figs. 2 and 6, and are bolted or riveted therein by bolts $b$, passing through the sockets and the arms from side to side or from edge to edge, as shown.

The sails F are of sheet metal in the form of segments, and are stiffened, if desired, by a surrounding rim of wrought-iron, $c$, preferably in one piece, as shown in Fig. 5, and riveted to the sails in any suitable manner.

Riveted or bolted to the top and bottom of each sail at its middle are angular bracket-lugs $d$, Fig. 4, against the outwardly-projecting portions of which the arms E fit, and to which they are bolted or otherwise secured, as is shown in Fig. 4. Thus each sail is secured at an angle, as seen in Figs. 2 and 3, and at its center to each of the arms E. Now, to stiffen and make rigid the arms E against lateral flexure, I use brace-rods G, extending from the top of one arm to the other, thus forming a polygonal brace extending entirely around the wheel and connecting all the arms. I preferably form eyes on the ends of these rods, and connect them to the arms by the same bolts which connect the bracket-lugs $d$ and the sails, as shown particularly in Fig. 4; and for further bracing the frame thus formed I employ further brace-rods, H, which extend radially and slanting back from a second hub, I, keyed or fastened upon the spindle A in front of the hub D; or, if desired, the hub I may be a prolongation and a part of the hub D. These rods H are threaded at their lower ends and inserted through apertures in the hub I, which is properly shaped to receive them, and they are tightened or strung up by nuts $e$, Fig. 2. Their upper ends have eyes, by which they are secured to the top edges of the sails, preferably by the same bolts which unite the sails and the arms E to the bracket-lugs $d$, as shown. I thus provide two sets of radial arms, one of which is at right angles to the axis of the spindle A and the other inclined thereto, and each pair of which meet at their upper ends and lie in the same plane. Hence it is that in Fig. 1 the arms E are not seen, as they are directly back of the arms H.

To unite the ends of the sails, I provide cross-ties or braces J, Figs. 3 and 4, which are inserted through the edges of the sails, secured thereto, and intersect the braces G. I preferably make the braces G and J in two pieces, which are screwed into a cross-coupling, *f*, as shown, and by this means they (the braces) may be tightened to give the required stiffness to the whole frame of the wheel.

By the above construction it will be seen that I provide a light though exceedingly-strong wheel, braced against all ordinary strains, and in which the sails are mainly supported at their middle portions instead of at their edges, as in most wheels hitherto used.

Referring now to Sheet 2, I would thus describe the remaining features of my improved engine:

The turn-table C, which carries the wheel-spindle bearing or sleeve B, is a hollow cylinder, tapering at its lower end, as shown, and is confined in a cylindrical or hollow tapering socket, K, secured upon the derrick or platform L. It is stepped into this socket, so as to give the least friction in turning, and is held from withdrawal by a collar, *g*, secured upon its lower protruding end, as seen in Fig. 7. To steady its upper end in turning, and to avoid friction, I provide three or more horizontal equidistant rollers, *h*, which project through openings in a cap-piece, M, and are journaled upon the same bolts which unite the cap to the socket K, as indicated. These rollers bear against the upper part of the turn-table, as shown.

The tail-vane socket K is pivoted between lugs O, extending from the side of the bracket-sleeve B, as shown, and at a point in front of the turn-table. The tail-vane may be of the usual or any suitable construction, and is braced against downward strain by the usual rod, *i*, swiveled to the post *j*, which is a vertical extension of the tail-vane pivot. The pivotal end of the tail-vane socket is provided with a right-angular foot, *k*, which, when the tail-vane is at right angles, or substantially so, to the wheel-spindle, bears against the side of the sleeve B and forms a stop, as well as a means for actuating a bell-crank brake, O', which is pivoted at its angle to the under side of the sleeve B, and serves to lock the wheel when thrown out of the wind, as will be presently explained. Rubber or other cushions, *l*, set into the sleeve B on each side of the tail-vane pivot, Fig. 12, prevent the shock and breakage which might occur in the sudden swinging of the tail-vane into either of its extreme positions, as will be readily understood.

Pivoted to the side of the tail-vane socket near its pivot is a governor-arm, P, carrying at its outer end an adjustable weight, R. This arm is connected by a pivoted link, *m*, to an eyebolt, *n*, or equivalent means of attachment, projecting from near the front end of the sleeve B, as represented. From the opposite side of the tail-vane socket, near its outer end, the operating chain, wire, or cord *p* passes over a swiveled pulley, *q*, attached to the edge of the turn-table, down through the turn-table within reach of the ground. Its lower end is attached to a pivoted lever, S, having at its outer end an adjustable weight, T, as shown in Fig. 7, where U is a support, to which the lever S is pivoted at *r*.

The pump-rod V, which passes down through the turn-table beside the chain *p*, has its upper end pivoted to a vibrating bar or walking-beam, W, which is pivoted at or near its middle between lugs *s* upon the top of the sleeve B. These lugs have rows of holes *t*, (see Fig. 10,) with corresponding holes in the walking-beam, so that the pivot pin or bolt may be shifted to vary the stroke of the pump-rod. Upon the front end of the walking-beam is a friction-roller, *u*, with a curved or rounded periphery, which is confined in an elliptical or cam slot, *a'*, in the rear face of the hub D, or in a separate disk keyed upon the wheel-spindle in rear of the wheel-hub. This slot is shown particularly in Fig. 13, and is so shaped as to give a uniform stroke to the pump-rod without fast or slow points in its movement. As the wind-wheel and turn-table have to be free to turn in a complete circle, so as to shift with the wind, it is necessary that the pump-rod should have a swivel-joint somewhere between its upper and lower ends, and I provide one in the following manner: Upon the lower threaded end of the upper section or half of the pump-rod (see Figs. 7 and 11) I first screw a nut or disk, *b'*, and against this place the horizontal ring or eye *c'*, formed upon or attached to the upper end of the lower half of the pump-rod. Then I slip or screw a second collar-nut, *d'*, over the end of the upper pump-rod and into the eye *c'*, leaving space between the collar and the eye, as shown. A nut, *e'*, holds the parts from becoming displaced. The chain or cord *p* is passed through apertures in the nuts *b' d'*, and to prevent the ring *c'* from slipping out of place and binding upon the cord *p*, I form a circular groove in the ring *c'*, into which a rib, *f'*, on either the nut *d'* or *b'*, fits, as shown.

Upon the governor-arm P, I secure a fan, A', which, when the tail-vane extends in line with the wheel-spindle, projects up and faces the wind. This fan is made of such size that in ordinary winds it plays no part, as its surface is not large; but in case of sudden gales, should the wheel be running, it would press down the governor-arm, and, aided by the weight R, would swing the tail-vane around at right angles, or substantially so, to the wheel-spindle, and thus throw the wheel out of the wind automatically. In doing this the lever S, with its weight, would have to be raised, and by means of the adjustment of the weights on their respective arms the machine can be set to turn at any given speed beyond which the fan A' would be forced back and the wheel be thrown out of the wind and stopped. Upon the lessening of the force of the wind the weight T would automatically reset the wheel by drawing down the chain *p*, and thereby pulling the tail-vane back in line, or substantially so, with the wheel-spindle, and the fan A' would be reset by the raising of the arm P.

Figs. 7 and 8 show the wheel thrown out of the wind, and Fig. 9 shows it in running position. The same result would be accomplished by dispensing with the lever S and by hanging weights directly upon the lower end of the cord $p$, and the setting of the machine could be regulated by increasing or diminishing the number of these weights, as in weighing-scales. To keep the wheel out of the wind, and consequently out of operation, any suitable means may be employed to suspend the weights or lever S. I have shown a hook, $g'$, which can engage with an eye or loop, $h'$, for this purpose.

The fan A' can also be made adjustable, so as to expose more or less of its surface to the wind by securing it to its rod or arm with an adjustable clamp or equivalent device.

Whenever the tail-vane is swung around at right angles to the wheel-spindle the foot $k$ presses against the end of the bell-crank O and forces its opposite end, which may be provided with a pad or brake-shoe, against the edge or periphery of the disk D, and thereby locks the wind-wheel to prevent its running.

It will be noticed that in the arrangement of the tail-vane socket and spindle-bearing sleeve I have so grouped the parts as to obtain the greatest strength, combined with lightness of metal. By rounding the roller $u$, which travels in the cam-slot, I always obtain an even bearing-surface at all positions of the walking-beam.

It will be further noticed that by the employment of the walking-beam instead of a crank, as is ordinarily used, the weight of the windwheel while the machine is running is largely supported on the pivot of the walking-beam, and is thus thrown much nearer the axis of the turn-table.

Having thus fully described my invention, I claim—

1. In a wind-engine, the wind-wheel the sails of which are attached at their middle to substantially-radial arms, which arms are connected to each other at their ends by tie-rods, and are further supported by inclined brace-arms extending from the top of each of the sail-arms to a point in front of the wind-wheel, substantially as described.

2. The herein-described wind-wheel, composed of the segmental inclined sails secured at their middle to substantially-radial arms and braced by the inclined rods H, the tie-rods G running around the wheel, and the sail-connecting braces J, substantially as described.

3. The combination, with the two-part pump-rod, of the ring $c'$, having an annular groove in its under face, the nut $d'$, having an annular rib which fits the groove of the ring, and the nut $b'$, fitting over the said ring $c'$, said parts $b'$, $c'$, and $d'$ being perforated for the passage of the tail-vane-operating cord, substantially as described.

4. In a wind-engine, the combination of a wind-wheel having its head mounted upon a vertical axis, a pivoted tail-vane, a weighted governor-arm connected to the wind-wheel head and to the tail-vane and tending to throw the wind-wheel out of the wind, a fan or vane attached to said governor-arm, and a second weighted governor-arm connected to the tail-vane, normally operating to keep the wind-wheel into the wind against the force of the first-mentioned governor-arm and overbalanced only by an abnormal force of wind against the fan or vane on said first-mentioned governor-arm, substantially as described.

5. In a wind-engine, the combination of a wind-wheel having its head mounted upon a vertical axis, a pivoted tail-vane, a weighted governor-arm connected to the wind-wheel head and to the tail-vane and tending to throw the wind-wheel out of the wind, a second weighted governor-arm connected to the tail-vane and normally operating to keep the wind-wheel into the wind against the force of the first-mentioned governor-arm, and locking devices, substantially as described, for locking the said second governor-arm when raised, so as to permit the first-mentioned governor-arm to throw the wheel out of the wind, substantially as described.

6. In a wind-engine having a hinged or pivoted tail-vane and a governor-arm for causing said tail-vane to swing at right angles, or substantially so, to the wheel-spindle, the combination, with said tail-vane, of an operating chain or cord and a second weighted governor-arm attached to the lower end of said chain to counterbalance the first governor-arm, and to cause the tail-vane to swing back in line with the wheel-spindle, substantially as described.

HENRY CROFT, Jr.

Witnesses:
JERE F. TWOHIG,
GUSA MEYER.